United States Patent
Lindner et al.

(10) Patent No.: US 6,180,075 B1
(45) Date of Patent: Jan. 30, 2001

(54) EXHAUST GAS CATALYST

(75) Inventors: Dieter Lindner, Hanau; Lothar Mussmann, Offenbach, both of (DE); Renee Van Yperen, Vecht (NL); Thomas Kreuzer, Karben; Egbert Lox, Hanau, both of (DE)

(73) Assignee: Degussa-Hüls Aktiengesellschaft, Frankfurt am Main (DE)

( * ) Notice: Under 35 U.S.C. 154(b), the term of this patent shall be extended for 0 days.

(21) Appl. No.: 09/056,641

(22) Filed: Apr. 8, 1998

Related U.S. Application Data

(60) Provisional application No. 60/053,219, filed on Jul. 18, 1997.

(30) Foreign Application Priority Data

Apr. 9, 1997 (DE) .............................. 197 14 536

(51) Int. Cl.$^7$ ................. B01J 8/02; B01J 23/44
(52) U.S. Cl. .................. 423/213.2; 423/213.5; 502/304
(58) Field of Search ............... 423/212, 213.2, 423/213.5; 502/304

(56) References Cited

U.S. PATENT DOCUMENTS

| | | | |
|---|---|---|---|
| 4,294,726 | 10/1981 | Bozon et al. | 252/462 |
| 4,624,940 | 11/1986 | Wan et al. | 502/251 |
| 4,965,243 | 10/1990 | Yamada et al. | 502/304 |
| 5,057,483 | 10/1991 | Wan | 502/304 |
| 5,212,142 * | 5/1993 | Dettling | 502/304 |
| 5,260,249 * | 11/1993 | Shiraishi et al. | 502/304 |
| 5,330,732 * | 7/1994 | Ishibashi et al. | 423/213.2 |
| 5,439,865 * | 8/1995 | Abe et al. | 502/333 |
| 5,492,878 * | 2/1996 | Fujii et al. | 502/304 |
| 5,624,940 | 4/1997 | Bryant et al. | 514/324 |
| 5,626,826 * | 5/1997 | Chopin et al. | 423/213.2 |
| 5,693,299 * | 12/1997 | Chopin et al. | 423/213.2 |
| 5,888,464 * | 3/1999 | Wu et al. | 423/213.5 |
| 6,040,265 * | 3/2000 | Nunan | 502/242 |

FOREIGN PATENT DOCUMENTS

| | | |
|---|---|---|
| 0337809A2 | 10/1989 | (EP) . |
| 0507590A1 | 10/1992 | (EP) . |
| 95/00235 | 1/1995 | (WO) . |

OTHER PUBLICATIONS

Databank CAPLUS: AN 1995:808353 for JP 07171392A2.
Databank CAPLUS: AN 1994:586124 for JP 06154606A2.
Databank CAPLUS: AN 1994:490494 for JP 06099069A2.

* cited by examiner

Primary Examiner—Steven P. Griffin
Assistant Examiner—Elin A. Warn
(74) Attorney, Agent, or Firm—Smith Gambrell & Russell, LLP

(57) ABSTRACT

A single-layered three-way catalytic converter containing palladium as the only catalytically active noble metal, with high activity and heat resistance. The catalyst contains, in addition to finely divided, stabilized aluminum oxide, at least one finely divided cerium/zirconium mixed oxide and optionally finely divided nickel oxide as well as highly dispersed amounts of cerium oxide, zirconium oxide and barium oxide. The palladium is distributed largely uniformly throughout the entire catalyst.

12 Claims, No Drawings

EXHAUST GAS CATALYST

REFERENCE TO AN RELATED APPLICATION

This applications claims the benefit of the Provisional Application Ser. No. 60/053,219 filed Jul. 18, 1997 which is relied on and incorporated herein by reference.

INTRODUCTION AND BACKGROUND

The present invention relates to an automotive exhaust gas catalyst which has a single-layered, catalytically active coating of high surface area support oxides on an inert carrier structure, wherein the coating contains palladium as the only catalytically active noble metal.

Internal combustion engines emit carbon monoxide CO, unburnt hydrocarbons HC and nitrogen oxides $NO_x$ as the main pollutants in the exhaust gas, a high percentage of these being converted into the harmless components water, carbon dioxide and nitrogen by modern exhaust gas treatment catalysts. Conversion takes place under substantially stoichiometric conditions, that is the oxygen in the exhaust gas is controlled using a so-called lambda sensor in such a way that the oxidation of carbon monoxide and hydrocarbons and the reduction of nitrogen oxides to nitrogen can take place almost quantitatively. The catalysts developed for this purpose are called three-way catalytic converters.

Stoichiometric conditions prevail when the normalized air/fuel-ratio $\lambda$ is 1. The normalized air/fuel-ratio $\lambda$ is the air/fuel ratio standardized to stoichiometric conditions. The air/fuel ratio states how many kilograms of air are required for complete combustion of one kilogram of fuel. In the case of conventional gasoline engine fuels, the stoichiometric air/fuel ratio has a value of 14.6. The engine exhaust gas has more or less large, periodic variations in normalized air/fuel-ratio depending on the load and the engine speed. To produce better conversion of oxidizable hazardous components under these conditions, oxygen-storing components such as, for example, cerium oxide are used which bind oxygen when it is present in excess and release it again for oxidative conversion when there is a deficiency of oxygen in the exhaust gas.

Future exhaust gas limits for internal combustion engines require an increasingly stringent reduction in the emissions of hazardous substances in standardized driving cycles. Given the current status of exhaust gas treatment, the hazardous substance emissions which still remain are produced during the cold-start phase. A substantially improved hazardous substance conversion over an entire driving cycle is therefore only possible by reducing cold-start emissions. This can be achieved, for example, by a catalyst with the lowest possible light-off temperature for hazardous substance conversions and/or by locating the catalyst only just downstream of the exhaust gas outlet from the engine in order to reduce the heating-up time required to reach the operating temperature of the catalyst.

If the catalyst is installed near to the engine, it is subjected to exhaust gas temperatures of up to 1100° C. during continuous operation of the engine, and at full speed. Thus catalysts which are temperature-resistant and have long-term stability are required for this type of use.

The present invention deals with catalyst coatings on inert, monolithic support structures, normally honeycomb structures with parallel flow channels for the exhaust gas. The number of flow channels per cross-sectional area is called the cell density. Inert carriers with cell densities between 10 and 250 $cm^{-2}$ are used, depending on the requirements of the application. These may be extruded, ceramic carriers made from cordierite, mullite or similar, temperature resistant materials. Alternatively, honeycomb structures made from steel sheeting may be used.

The catalytic coating generally contains several noble metals from the platinum group of the Periodic System of elements as catalytically active components, these being deposited in highly dispersed form on the specific surface area of high surface area support materials. The coating also contains further components such as oxygen-storing materials, promoters and stabilizers. The coating is applied to the internal walls of the flow channels by known coating processes, using an aqueous coating dispersion which contains the various components of the catalyst.

The inert monolithic carriers are also called support carriers in the context of this invention in order to be able to differentiate them more easily from the high surface area support materials for the catalytically active components. High surface area materials are those materials whose specific surface area, or BET surface area (measured in accordance with DIN 66132), is at least 10 $m^2/g$. So-called active aluminum oxides satisfy this condition. These are finely divided aluminum oxides which have the crystal structures of the so-called transition phases of aluminum oxide. These include chi, delta, gamma, kappa, theta and eta-aluminum oxide.

The catalyst components may be added to the coating dispersion in a variety of forms:

a) as "finely divided solids"

This is understood to mean powdered materials with particle sizes between 1 and about 50 $\mu$m. In the English language literature, the expressions "bulk material" or "particulate material" are used for these.

b) as "colloidal solids"

These have particle sizes of less than 1 $\mu$m. The particulate structure of finely divided and colloidal solids is retained even in the final catalyst coating.

c) in the form of soluble "precursor compounds"

Precursor compounds are converted into actual catalyst components only by subsequent calcination and optionally reduction and are then present in a highly dispersed form.

The catalytically active metals from the platinum group or stabilizers such as lanthanum oxide and barium oxide are preferably incorporated into the coating as soluble precursor compounds in the coating dispersion or introduced only later by impregnating the coating. After a subsequent calcination procedure, these materials are present in a highly dispersed form (crystallite sizes in general of less than 5–10 nm) on the specific surface areas of the high surface area, finely divided components of the catalyst. They are also called "highly dispersed materials" in the context of this invention.

The aim of the present invention is to develop a catalyst suitable for use in the area mentioned above which operates exclusively with palladium as the catalytically active noble metal. Palladium is characterized, as compared with platinum, by a lower price, which is important with regard to the economic viability of the catalyst. In addition, it is known that palladium is a very effective catalyst for the oxidation of unburnt hydrocarbons, in particular paraffins and aromatic compounds. It has a superior effect, with reference to the same mass, to that of platinum.

U.S. Pat. No. 4,624,940 describes a three-way catalytic converter in the form of a coating on a monolithic support carrier which contains only palladium as a catalytically active component and which retains its catalytic activity even after aging at temperatures higher than 1000° C. The coating contains at least three different finely divided materials: thermally stable aluminum oxide as support material for a metal from the platinum group, further metal oxides as promoters which do not contain metals from the platinum group and inert, thermally stable fillers. The support material is stabilized with lanthanum, barium and silicon. The lanthanum oxide used for stabilizing purposes may contain up to 10 wt. % of praseodymium oxide. Cerium oxide, zirconium oxide or mixtures thereof are used as promoters. Finely divided cordierite, mullite, magnesium/aluminum titanate and mixtures thereof are used as fillers. Palladium is preferably used as a metal from the platinum group. According to U.S. Pat. No. 4,624,940, care has to be taken to ensure that palladium is not deposited on the cerium oxide-containing promoters because this would impair the effectiveness of both the palladium and the promoter.

U.S. Pat. No. 5,057,483 describes a catalyst composition which consists of two discrete layers on a monolithic carrier structure. The first layer contains a stabilized aluminum oxide as support material for platinum and finely divided cerium oxide. The first layer may also contain finely divided iron oxide and nickel oxide to suppress hydrogen sulphide emissions and also highly dispersed barium oxide and zirconium oxide as thermal stabilizers, these being distributed throughout the entire layer. The second layer contains a coprecipitated cerium/zirconium mixed oxide, onto which rhodium is deposited, and an activated aluminum oxide as support material for platinum. The coprecipitated cerium/zirconium mixed oxide preferably contains 2 to 30 wt. % of cerium oxide.

U.S. Pat. No. 4,294,726 describes a single-layered catalyst composition on an inert carrier structure which has platinum, rhodium and base metals as catalytically active components, these being deposited on an active aluminum oxide. The active aluminum oxide contains cerium oxide, zirconium oxide and iron oxide. The catalyst is obtained by impregnating active aluminum oxide with an aqueous solution of cerium, zirconium and iron salts. After calcining the aluminum oxide treated in this way, it is then impregnated again with an aqueous solution of platinum and rhodium salts.

U.S. Pat. No. 4,965,243 also describes a single-layered, thermally stable, three-way catalytic converter on a monolithic carrier structure which is obtained by coating the carrier structure with a coating dispersion which contains a metal from the platinum group, active aluminum oxide, cerium oxide, a barium compound and a zirconium compound.

WO 95/00235 describes a two-layered catalyst on an inert carrier structure which contains only palladium as a catalytically active component. The first layer contains a first support material and at least one first palladium component and a first oxygen-storing component which is in intimate contact with the palladium component. The second layer contains a second support material and at least one second palladium component. γ-aluminum oxide is used as a first support material and palladium is deposited on this by impregnating with an aqueous palladium nitrate solution. The aluminum oxide obtained in this way is processed with a colloidal dispersion of cerium oxide (particle size about 10 nm), cerium nitrate crystals, lanthanum nitrate crystals, barium acetate crystals, a zirconium acetate solution, a cerium/zirconium mixed oxide powder and a nickel oxide powder to give a coating dispersion for the first layer. For the second layer, a coating dispersion is made up which contains aluminum oxide coated with palladium in the same way as for the first layer as well as lanthanum nitrate crystals, neodymium nitrate crystals, zirconium nitrate crystals and strontium nitrate crystals. After each coating procedure, the carrier structure is calcined at 450° C. in order to convert the precursor compounds of the various coating components into the corresponding oxides.

SUMMARY OF THE INVENTION

It is an object of the present invention to provide a catalyst which contains only palladium as the catalytically active noble metal, which can be prepared very cost-effectively and which has, in addition to good degrees of conversion for hydrocarbons, carbon monoxide and nitrogen oxides, exceptional heat and aging resistance.

This and other objects are achieved by an automotive exhaust gas catalyst which contains, on a carrier structure, a single-layered, catalytic coating containing the following components:

a) finely divided, stabilized, active aluminum oxide, b) at least one finely divided oxygen-storing component, c) optionally, finely divided nickel oxide, d) and additional highly dispersed cerium oxide, zirconium oxide and barium oxide and e) as the only catalytically active noble metal, palladium which is in close contact with all the components in the coating.

γ-aluminum oxide with a specific surface area of more than 100 m$^2$/g and stabilized with lanthanum is preferably used for the catalyst. 2 to 4 wt. % of lanthanum oxide, which may for example be incorporated in the aluminum oxide in a known manner by impregnation, is sufficient for stabilizing purposes.

DETAILED DESCRIPTION OF INVENTION

The present invention will now be described in further detail. A cerium/zirconium mixed oxide which can be obtained, for example, by coprecipitation in the way described in EP 0605274 A1 is preferably used as an oxygen-storing component. The material preferably contains 15 to 35 wt. % of zirconium oxide, with reference to its total weight. If the amount of zirconium oxide is less than 15 wt. %, the aging resistance of the material is no longer sufficient. Due to its high cerium oxide content, this material has an outstanding oxygen-storage capacity.

If very high temperatures of up to 1100° C. are expected during use of the catalyst, it is recommended that the mixed oxide mentioned above be replaced, entirely or partly, by a zirconium-rich cerium/zirconium mixed oxide containing 70 to 90 wt. % of zirconium oxide. Due to its high zirconium oxide content, this material is particularly heat resistant, but it has a lower oxygen-storage capacity in the freshly-prepared state.

As an alternative to this, a material may also be used which comprises cerium oxide in highly dispersed form on finely divided zirconium oxide. The highly dispersed cerium oxide may be fixed on the zirconium oxide by impregnation followed by calcination. This material has sufficient oxygen-storage capacity even with a cerium oxide concentration of only 10 to 30 wt. %. Highly dispersed mixtures of cerium oxide and praseodymium oxide on zirconium oxide are also particularly advantageous, wherein 1 to 20 wt. % of praseodymium oxide is present, with reference to cerium oxide.

Another finely divided oxygen-storage component, which is characterized by particularly good aging stability, is obtained by impregnating the cerium-rich cerium/zirconium mixed oxide mentioned above with 1 to 10 wt. %, with reference to the total weight of the final component, of praseodymium oxide.

The ratio by weight in the catalyst between active aluminum oxide, the oxygen-storing component and additional highly dispersed cerium oxide, zirconium oxide, barium oxide and finely divided nickel oxide is preferably adjusted to:

100:20–100:15–40:20–40:10–30:0–10.

Optimum light-off temperatures and activities for the catalyst are produced when the amount of catalyst coating on the carrier structure is between 50 and 600 g/l of carrier structure volume and the palladium concentration is between 1 and 15, preferably 2 to 5 g/l of carrier structure volume.

The actual amount of coating used on the carrier structure depends on the specifications for hazardous substance conversion and long-term stability as well as on the cell density of the honeycomb structure. Average layer thicknesses of about 30 to 50 μm are preferably produced on the channel walls. The amount of coating required for this is 50 to 600 g/l of carrier structure volume, depending on the cell density, wherein the upper value is used for carrier structures with cell densities of 250 cm$^{-2}$. The larger the amount of coating on a given carrier structure, the greater is the risk that the exhaust gas pressure will rise to an excessive extent due to narrowing of the flow channels, thus reducing the power of the engine. This effect restricts the amount of coating which can realistically be applied to a maximum value.

To prepare the catalyst, an aqueous coating dispersion is made up by dispersing the active aluminum oxide, the oxygen-storing component and optionally nickel oxide in powdered form in water, with the addition of soluble cerium oxide, zirconium oxide and barium oxide precursors. The inner walls of the flow channels in a honeycomb carrier structure made of ceramic or metal is coated with this coating dispersion by, for example, immersion. In the case of carrier structures made from strips of metal sheeting, the films may also be applied to the strips before shaping into the carrier structure. After drying and calcining the coating, palladium is deposited on all the components in the coating in highly dispersed form by immersing the carrier structure in an aqueous impregnating solution of soluble precursors of palladium.

As an alternative to this procedure, there is also the possibility of first making up a coating powder which contains all the components for the catalyst. Here, an aqueous dispersion of powdered aluminum oxide, the oxygen-storing component and optionally nickel oxide as well as soluble cerium oxide, zirconium oxide and barium oxide precursors is made up. The dispersion is dewatered, dried and calcined. The coating powder obtained in this way is then redispersed, a palladium precursor is added and it is then applied to the inner walls of the carrier structure using known methods. The coating obtained in this way is then dried and calcined. Calcination may optionally be performed in a hydrogen-containing stream of gas at 300 to 500° C. (for example, forming gas consisting of 5 vol-% hydrogen, the remainder being nitrogen) to reduce the palladium.

Both alternative methods of preparation for the catalyst ensure the close contact between palladium and all the other components in the catalyst which is required by the manner in which the palladium is applied.

Suitable soluble precursors of cerium oxide, zirconium oxide and barium oxide are nitrates, ammonium nitrates, chlorides, oxalates, acetates, citrates, formates, propionates, thiocyanates and oxychlorides of cerium, zirconium and barium. Nitrates and acetates are preferably used. A variety of palladium salts are suitable as precursors of palladium. Palladium nitrate is preferably also used here.

The drying stages used during preparation of the catalyst are not critical. They may be performed in air in the temperature range between 100 and 180° C. for a period of 0.25 to 2 hours. Calcination is preferably performed at temperatures between 300 and 800° C. for a period of 0.5 to 3 hours.

To homogenize the coating dispersion, this is usually milled in a ball mill until an average particle size $d_{50}$ of 1 to 5, preferably 3 to 5 μm is reached for the finely divided material to be used ($d_{50}$ is understood to represent the particle diameter which is greater than or equal to the diameter of 50 wt.% of the material). To improve turbulence of the exhaust gas in the flow channels, a coarse-grained but high surface area material may be added to the coating dispersion, as described in U.S. Pat. No. 5,496,788. This roughens the surface of the final coating and causes turbulence in the exhaust gas and thus an improvement in material exchange between the exhaust gas and the catalyst coating.

Depending on the consistency of the coating dispersion, the required amount of coating may be extracted onto the carrier structure by immersing the carrier structure, for example, once or several times. The solids content and viscosity of the coating dispersion are preferably adjusted in such a way that the amount of coating required can be applied in a single coating procedure. This is the case, for example, when the solids content of the coating dispersion is 30 to 70 wt.% and the density is 1.4 to 1.8 kg/dm$^3$.

Raw materials with the following properties were used to make up the catalysts in the following examples and comparison examples to explain the invention in more detail:

La/Al$_2$O$_3$: γ-aluminum oxide, stabilized with 2 to 4 wt. % of lanthanum, calculated as lanthanum oxide;
BET surface area: 140 m$^2$/g;
initial particle size: $d_{50}$≈15 μm;

γ-Al$_2$O$_3$: pure gamma-aluminum oxide;
BET surface area: 140 m$^2$/g
initial particle size: $d_{50}$≈15 μm;

CeO$_2$/ZrO$_2$ (70/30): coprecipitated cerium/zirconium mixed oxide;
concentration of zirconium oxide: 30 wt. %;
BET surface area: 60 m$^2$/g;
initial particle size: $d_{50}$≈30 μm;

CeO$_2$/ZrO$_2$ (20/80): coprecipitated cerium/zirconium mixed oxide;
concentration of zirconium oxide: 80 wt. %;
BET surface area: 80 m$^2$/g;
initial particle size: $d_{50}$≈2 μm;

CeO$_2$/ ZrO$_2$/Pr$_6$O$_{11}$: highly dispersed Pr$_6$O$_{11}$ on cerium/zirconium mixed oxide with 67 wt. % of cerium oxide, 28 wt. % of zirconium oxide and 5 wt. % of praseodymium oxide;
BET surface area: 60 m$^2$/g;
initial particle size: $d_{50}$≈17 μm;

Ce(C$_2$H$_3$O$_2$)$_3$: cerium acetate;
ZrO(C$_2$H$_3$O$_2$)$_2$: zirconyl acetate;
Ba(C$_2$H$_3$O$_2$)$_2$: barium acetate;
NiO: nickel oxide;
BET surface area: 20 m$^2$/g;
initial particle size: $d_{50}$≈14 μm;

carrier structure: honeycomb structure made from cordierite with 62 channels per square centimeter of cross-sectional area;
dimensions: 3.8 cm diameter; 15.2 cm length

EXAMPLE 1

A coating dispersion was made up to coat the carrier structure, containing 300 g of cerium/zirconium mixed oxide, 300 g of cerium oxide as cerium acetate, 300 g of zirconium oxide as zirconium acetate, 200 g of barium oxide as barium acetate and 43 g of nickel oxide per 1000 g of stabilized aluminum oxide. The final coating dispersion had a solids content of 34 wt. %.

The carrier structure was coated by immersing once in this coating dispersion, dried in air at 120° C. for 0.5 h and calcined in air for a period of 4 h at 500° C. Then the coating was impregnated by immersing the carrier structure in an aqueous solution of palladium nitrate and then dried and calcined again. After drying and calcining, the carrier structure had a coating concentration of about 218 g/l, which was made up as follows:

| Substance | Concentration [g/l] |
|---|---|
| La/Al$_2$O$_3$ | 100 |
| CeO$_2$/ZrO$_2$ 70/30 | 30 |
| CeO$_2$ ex acetate | 30 |
| ZrO$_2$ ex acetate | 30 |
| BaO ex acetate | 20 |
| NiO | 4.3 |
| Pd ex nitrate | 3.9 |
| Total | 218.2 |

COMPARISON EXAMPLE 1

A comparison catalyst was made up with the same chemical composition as that in example 1. Differently from example 1, however, the palladium was prefixed onto the aluminum oxide before making up the coating dispersion. Here, 1000 g of aluminum oxide were treated with an aqueous solution of palladium nitrate which contained 39 g of palladium, using the pore volume impregnation method. In this case, the total amount of palladium was fixed on the aluminum oxide.

COMPARISON EXAMPLE 2

Another comparison catalyst was made up with the same chemical composition as the one in example 1. Differently from example 1 and comparison example 1, half of the palladium was prefixed on the cerium/zirconium mixed oxide and half on the aluminum oxide.

APPLICATION EXAMPLE 1

The conversion rates of the catalysts according to example 1, comparison example 1 and comparison example 2 for the hazardous substances CO, HC and NO$_x$ were tested after aging using a 1.8 l gasoline engine. Aging was performed at a bed temperature (temperature of the catalyst) of 1000° C. for a period of 40 hours. The conversion rates were measured on an engine test-stand at a bed temperature of 400° C. and with different normalized air/fuel-ratios $\lambda$. To simulate real conditions, the normalized air/fuel-ratio was modulated with a frequency of 1 Hz and amplitudes of ±0.5 A/F (air/fuel ratio) and ±1.0 A/F. The space velocity during these measurements was approximately 50000 h$^{-1}$.

The results of the measurements are given in Tables 1 and 2. The experimental values recorded in the Tables are averages of at least two measurements.

TABLE 1

Engine test of catalysts from example 1 (E1), comparison example 1 (CE1) and comparison example 2 (CE2) after engine aging at 1000° C. for a period of 40 hours; Exhaust gas temperature 400° C.; exhaust gas modulation: 1.0 Hz ± 0.5 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | NO$_x$ % | CO % | HC % | NO$_x$ % | CO % | HC % | NO$_x$ % | CO % | HC % | NO$_x$ % | CO % | HC % | NO$_x$ % |
| E1 | 58.8 | 89.6 | 72.9 | 62.5 | 90.2 | 66.6 | 63.4 | 90.5 | 63.2 | 65.4 | 90.6 | 57.7 | 67.9 | 90.5 | 55.9 |
| CE1 | 44.7 | 87.9 | 62.4 | 47.7 | 88.5 | 57.6 | 50.2 | 88.4 | 56.4 | 51.8 | 88.8 | 53.8 | 54.0 | 88.7 | 52.3 |
| CE2 | 27.5 | 77.9 | 44.9 | 29.8 | 78.8 | 41.7 | 31.5 | 78.6 | 41.4 | 32.2 | 79.8 | 39.9 | 32.8 | 80.3 | 39.7 |

TABLE 2

Engine test of catalysts from example 1 (E1), comparison example 1 (CE1) and comparison example 2 (CE2) after engine aging at 1000° C. for a period of 40 hours; Exhaust gas temperature 400° C.; exhaust gas modulation: 1.0 Hz ± 1.0 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | NO$_x$ % | CO % | HC % | NO$_x$ % | CO % | HC % | NO$_x$ % | CO % | HC % | NO$_x$ % | CO % | HC % | NO$_x$ % |
| E1 | 63.1 | 88.4 | 77.3 | 68.4 | 88.5 | 77.3 | 85.3 | 91.3 | 73.9 | 91.7 | 91.4 | 62.8 | 93.7 | 91.4 | 57.7 |
| CE1 | 61.9 | 88.5 | 74.5 | 67.0 | 88.6 | 71.7 | 75.7 | 89.6 | 67.0 | 81.6 | 89.7 | 60.0 | 86.3 | 90.1 | 55.4 |
| CE2 | 36.7 | 66.3 | 34.8 | 36.2 | 67.1 | 36.1 | 52.3 | 81.8 | 46.1 | 57.7 | 83.7 | 44.9 | 63.9 | 85.7 | 43.4 |

EXAMPLE 2

Another catalyst was prepared in accordance with the invention. Differently from example 1, however, the palladium was not introduced into the coating by impregnation but palladium nitrate was added to the coating dispersion. The chemical composition of the catalyst was identical to that in example 1.

COMPARISON EXAMPLE 3

A carrier structure was coated with a two-layered catalyst in accordance with example 1 in WO 95/00235. The coating dispersions were made up exactly in accordance with the data in the WO document which is relied on and corporate by reference for this purpose. The individual preparation steps can therefore be obtained from that document. The final coating had the following composition:

| 1st layer | | 2nd layer | |
|---|---|---|---|
| Substance | [g/l] | Substance | [g/l] |
| γ-$Al_2O_3$ + Pd | 43 1.94 | γ-$Al_2O_3$ + Pd | 43 1.94 |
| $CeO_2$ | colloidal 18.4 | $ZrO_2$ ex nitrate | 6.1 |
| $CeO_2$ | ex nitrate 30.7 | $La_2O_3$ ex nitrate | 6.1 |
| $CeO_2/ZrO_2$ 20/80 | 30.7 | $Nd_2O_3$ ex nitrate | 6.1 |
| $ZrO_2$ | ex acetate 8.6 | SrO ex nitrate | 6.1 |
| $La_2O_3$ | ex nitrate 6.1 | | |
| BaO | ex acetate 3.7 | | |
| NiO | 4.3 | | |
| Total | 147.44 | Total | 69.34 |

APPLICATION EXAMPLE 2

The conversion rates of catalysts according to example 2 and comparison example 3 were measured after aging as described in application example 1. Differently from application example 1, the measurements were performed with an exhaust gas temperature of 450° C. The experimental results are given in Tables 3 and 4. They show that, with the catalyst according to the invention, the object of the invention, a single-layered catalyst with a simple layer structure, which provides the same or better performance data than conventional catalysts, is achieved in full.

EXAMPLE 3

Preparation of the catalyst in example 2 was repeated.

EXAMPLE 4

Another catalyst according to the invention was prepared with a slightly modified ratio of components in the coating dispersion with respect to each other in the same way as in example 2. Instead of the cerium/zirconium mixed oxide, the cerium/zirconium modified by impregnating with praseodymium oxide was used. The composition of the final coating is given below:

| Substance | Concentration [g/l] |
|---|---|
| La/$Al_2O_3$ | 100 |
| $CeO_2$/$ZrO_2$/$Pr_6O_{11}$ 67/28/5 | 45 |
| $CeO_2$ ex acetate | 20 |
| $ZrO_2$ ex acetate | 25 |
| BaO ex acetate | 20 |
| NiO | 4.3 |
| Pd ex nitrate | 3.9 |
| Total | 218.2 |

APPLICATION EXAMPLE 3

The same tests were performed with the two catalysts in examples 3 and 4 as with the other catalysts. The experimental results are given in Tables 5 and 6. Differently from the preceding examples, the catalysts were subjected to a more intense aging procedure in order to demonstrate the positive effect on aging stability of cerium/zirconium mixed oxide modified with praseodymium oxide. The more intense aging procedure was performed using a 2.0 l gasoline engine at an exhaust gas temperature of 1050° C. for a period of 40 hours. The space velocity during measurement of the rates of conversion was again 50,000 $h^{-1}$.

TABLE 3

Engine test of catalysts from example 2 (E2) and comparison example 3 (CE3) after engine aging at 1000° C. for a period of 40 hours;

Exhaust gas temperature 450° C.; exhaust gas modulation: 1.0 Hz ± 0.5 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | $NO_x$ % | CO % | HC % | $NO_x$ % | CO % | HC % | $NO_x$ % | CO % | HC % | $NO_x$ % | CO % | HC % | $NO_x$ % |
| E2 | 52.2 | 90.4 | 78.3 | 69.6 | 92.4 | 82.6 | 87.1 | 94.3 | 86.2 | 97.6 | 94.7 | 76.2 | 98.7 | 93.9 | 59.3 |
| CE3 | 55.9 | 90.5 | 80.8 | 66.5 | 91.3 | 79.5 | 78.1 | 91.7 | 76.8 | 89.8 | 92.4 | 69.9 | 95.6 | 92.1 | 57.5 |

TABLE 4

Engine test of catalysts from example 2 (E2) and comparison example 3 (CE3) after engine aging at 1000° C. for a period of 40 hours;
Exhaust gas temperature 450° C.; exhaust gas modulation: 1.0 Hz ± 1.0 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | $NO_x$ % | CO % | HC % | $NO_x$ % | CO % | HC % | $NO_x$ % | CO % | HC % | $NO_x$ % | CO % | HC % | $NO_x$ % |
| E2 | 72.9 | 94.5 | 94.4 | 73.6 | 94.1 | 81.6 | 77.0 | 94.2 | 74.7 | 80.5 | 94.2 | 69.9 | 83.0 | 94.0 | 66.0 |
| CE3 | 52.1 | 90.1 | 66.2 | 54.0 | 90.2 | 62.0 | 56.1 | 90.7 | 60.8 | 60.2 | 90.9 | 58.6 | 63.6 | 90.9 | 57.4 |

TABLE 5

Engine test of catalysts from example 3 (E3) and example 4 (E4) after intensified engine aging at 1050° C. for a period of 40 hours;
Exhaust gas temperature 450° C.; exhaust gas modulation: 1.0 Hz ± 0.5 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | $NO_x$ % | CO % | HC % | $NO_x$ % | CO % | HC % | $NO_x$ % | CO % | HC % | $NO_x$ % | CO % | HC % | $NO_x$ % |
| E3 | 59.8 | 89.4 | 70.6 | 77.3 | 91.3 | 75.4 | 91.2 | 92.1 | 62.5 | 95.0 | 91.7 | 51.1 | 95.8 | 92.0 | 45.9 |
| E4 | 64.2 | 90.6 | 78.5 | 83.8 | 93.6 | 80.9 | 97.7 | 94.2 | 63.2 | 98.1 | 93.2 | 55.1 | 98.3 | 93.3 | 48.2 |

TABLE 6

Engine test of catalysts from example 3 (E3) and example 4 (E4) after intensified engine aging at 1050° C. for a period of 40 hours;
Exhaust gas temperature 450° C.; exhaust gas modulation: 1.0 Hz ± 1.0 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | $NO_x$ % | CO % | HC % | $NO_x$ % | CO % | HC % | $NO_x$ % | CO % | HC % | $NO_x$ % | CO % | HC % | $NO_x$ % |
| E3 | 53.7 | 90.6 | 56.4 | 55.5 | 90.7 | 54.6 | 57.0 | 90.6 | 53.1 | 63.5 | 90.9 | 49.1 | 66.8 | 91.3 | 46.5 |
| E4 | 71.5 | 93.7 | 73.1 | 76.9 | 94.0 | 70.2 | 79.2 | 93.9 | 67.9 | 82.8 | 93.9 | 63.2 | 85.5 | 94.1 | 57.2 |

EXAMPLE 5

Another catalyst was prepared in the same way as described in example 4. However, 20 g of the $CeO_2/ZrO_2/Pr_6O_{11}$ were replaced by 70 g of the zirconium-rich cerium/zirconium mixed oxide with a concentration of zirconium of 80 wt. %. This meant that the concentration of $CeO_2$ in the catalyst was approximately the same as in example 4. The source of the $CeO_2$ was now distributed between $CeO_2/ZrO_2/Pr_6O_{11}$, $CeO_2/ZrO_2$ (20/80) and highly dispersed cerium oxide. The composition of the final coating is given below.

| Substance | Concentration [g/l] |
|---|---|
| $La/Al_2O_3$ | 100 |
| $CeO_2/ZrO_2/Pr_6O_{11}$ 67/28/5 | 25 |
| $CeO_2/ZrO_2$ 20/80 | 70 |
| $CeO_2$ ex acetate | 20 |
| $ZrO_2$ ex acetate | 25 |
| BaO ex acetate | 20 |
| NiO | 4.3 |
| Pd ex nitrate | 3.9 |
| Total | 268.2 |

APPLICATION EXAMPLE 4

One catalyst from each of examples 4 and example 5 were subjected to an intensified aging procedure at 1050° C. for a period of 40 hours, as described in application example 3. Measuring the rates of conversion for the catalysts was performed at double the space velocity, i.e. at 100000 $h^{-1}$.

The results of the measurements are given in Tables 7 and 8.

As can be seen from the example of the invention, the catalysts of this invention are platinum-free.

Further modifications and variations will be apparent to those skilled in the art from the foregoing and are intended to be encompassed by the claims appended hereto.

German priority application 197 14 536.1 is relied on and incorporated herein by reference.

TABLE 7

Engine test of catalysts from example 4 (E4) and example 5 (E5) after intensified engine aging at 1050° C. for a period of 40 hours;
Exhaust gas temperature 450° C.; exhaust gas modulation: 1.0 Hz ± 0.5 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | $NO_x$ % | CO % | HC % | $NO_x$ % | CO % | HC % | $NO_x$ % | CO % | HC % | $NO_x$ % | CO % | HC % | $NO_x$ % |
| E4 | 59.9 | 81.4 | 55.4 | 66.7 | 81.4 | 52.3 | 69.7 | 81.9 | 49.4 | 74.5 | 81.7 | 46.6 | 80.3 | 81.6 | 42.9 |
| E5 | 71.0 | 86.6 | 69.8 | 80.9 | 87.1 | 66.2 | 86.0. | 87.5 | 60.0 | 88.9 | 86.9 | 52.7 | 93.2 | 86.7 | 43.6 |

TABLE 8

Engine test of catalysts from example 4 (E4) and example 5 (E5) after intensified engine aging at 1050° C. for a period of 40 hours;
Exhaust gas temperature 450° C.; exhaust gas modulation: 1.0 Hz ± 1.0 A/F (air/fuel ratio)

| | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| Ex. | CO % | HC % | $NO_x$ % | CO % | HC % | $NO_x$ % | CO % | HC % | $NO_x$ % | CO % | HC % | $NO_x$ % | CO % | HC % | $NO_x$ % |
| E4 | 40.1 | 77.0 | 43.4 | 42.2 | 77.2 | 41.0 | 44.4 | 77.4 | 40.5 | 45.2 | 76.6 | 38.0 | 45.6 | 77.3 | 37.9 |
| E5 | 57.2 | 84.9 | 55.0 | 62.2 | 85.0 | 51.2 | 64.4 | 84.8 | 47.8 | 64.8 | 84.4 | 45.4 | 65.2 | 84.5 | 44.8 |

We claim:

1. An automotive exhaust gas catalyst having a carrier structure, and having deposited on the carrier structure a single-layered catalytically active coating, the coating comprising:
    a particulate, stabilized, active aluminum oxide;
    at least one particulate oxygen-storing component comprising a mixed oxide of cerium and zirconium oxide with a concentration of zirconium oxide of 15 to 35 wt. % zirconium oxide with respect to the total weight of the particulate oxygen-storing component;
    an additional highly dispersed composition comprised of cerium oxide, zirconium oxide and barium oxide;
    optionally particulate nickel oxide; and
    palladium, as the only catalytically active noble metal, in close contact with the other components of the coating
    wherein the active aluminum oxide, the particulate oxygen-storing component, the highly dispersed cerium oxide, the highly dispersed zirconium oxide, the highly dispersed barium oxide, and the optionally provided particulate nickel oxide, are present in a ratio by weight with respect to each other, of 100:20–100:15–40:20–40: 10–30:0–10.

2. The automotive exhaust gas catalyst according to claim 1, wherein the at least one particulate oxygen-storing component comprises cerium/zirconium mixed oxide, and further comprises 1 to 10 wt. % praseodymium oxide.

3. The automotive exhaust gas catalyst according to claim 1, further comprising, as a further particulate, oxygen-storing component, a zirconium-rich cerium/zirconium mixed oxide with a concentration of 70 to 90 wt. % zirconium with respect to the total weight of the oxygen-stoning component.

4. The automotive exhaust gas catalyst according to claim 3, wherein the particulate cerium/zirconium mixed oxides are each modified with a further 1 to 10 wt. % of praseodymium oxide, with respect to the total weight of each of the relevant mixed oxides.

5. The automotive exhaust gas catalyst according to claim 1, wherein the particulate, oxygen-storing component comprises zirconium oxide onto which highly dispersed cerium oxide is deposited in amounts of 10 to 30 wt. %, with respect to the total weight of the oxygen-storing component.

6. The automotive exhaust gas catalyst according to claim 5, wherein the highly dispersed cerium oxide comprises 1 to 20 wt. % praseodymium oxide, with respect to the cerium oxide.

7. An automotive exhaust gas catalyst having a carrier structure, and having deposited on the carrier structure a single-layered catalytically active coating, the coating comprising:
    a particulate, stabilized, active aluminum oxide;
    at least one particulate oxygen-storing component comprising a mixed oxide of cerium and zirconium oxide with a concentration of zirconium oxide of 15 to 35 wt. % zirconium oxide with respect to the total weight of the particulate oxygen-storing component;
    an additional highly dispersed composition comprised of cerium oxide, zirconium oxide and barium oxide, deposited as soluble precursor compounds;
    optionally particulate nickel oxide; and
    palladium, as the only catalytically active noble metal, in close contact with the other components of the coating,
    wherein the active aluminum oxide the particulate oxygen-storing component, the highly dispersed cerium oxide, the highly dispersed zirconium oxide, the highly dispersed barium oxide, and the optionally provided particulate nickel oxide, are present in a ratio by weight with respect to each other, of 100:20–100:15–40:20–40:10–30: 0–10.

8. The automotive exhaust gas catalyst according to claim 7, wherein the at least one particulate oxygen-storing component comprises cerium/zirconium mixed oxide, and further comprises 1 to 10 wt. % praseodymium oxide.

9. The automotive exhaust gas catalyst according to claim 7, further comprising, as a further particulate, oxygen-storing component, a zirconium-rich cerium/zirconium mixed oxide with a concentration of 70 to 90 wt. % zirconium with respect to the total weight of the oxygen-storing component.

10. The automotive exhaust gas catalyst according to claim 9, wherein the particulate cerium/zirconium mixed oxides are each modified with a further 1 to 10 wt. % of praseodymium oxide, with respect to the total weight of each of the relevant mixed oxides.

11. The automotive exhaust gas catalyst according to claim 7, wherein the particulate, oxygen-storing component comprises zirconium oxide onto which highly dispersed cerium oxide is deposited in amounts of 10 to 30 wt. %, with respect to the total weight of the oxygen-storing component.

12. The automotive exhaust gas catalyst according to claim 11, wherein the highly dispersed cerium oxide comprises 1 to 20 wt. % praseodymium oxide, with respect to the cerium oxide.

* * * * *